3,513,026
Patented May 19, 1970

3,513,026
METHOD OF WASHING ANIMAL CAGES AND OTHER SIMILAR DEVICES IN A WASHER
Richard B. Kennedy, Ridgefield, Conn., assignor to Better Built Machinery Corporation, New York, N.Y., a corporation of Delaware
No Drawing. Filed Mar. 4, 1968, Ser. No. 709,929
Int. Cl. B08b 3/08
U.S. Cl. 134—27          12 Claims

ABSTRACT OF THE DISCLOSURE

Washing articles contaminated with animal wastes, using a sequence of acid wash followed by caustic wash or washes. The acid wash descales urine etc. scales; the caustic neutralizes, besides its detergent effect, and is employed before draining or dumping, to avoid acid-damage to drain pipes. One or more rinses may follow the dumping. For economy of water, the caustic wash may be effected by adding caustic directly to the used acid wash bath in situ to neutralize the acid therein and to raise the pH to caustic wash value.

BACKGROUND OF THE INVENTION

Field of the invention

The invention relates to methods of washing animal cages or other articles which are subjected to build up of urine scale or contaminated by animal waste.

Description of the prior art

In the prior art can be found a number of washers for animal cages. One such is disclosed in said Pat. No. 3,277,906. This patent discloses a machine for washing animal cages in a standard wash cycle, with water and detergent including various periods of water fill, wash periods, drain periods and rinse periods and these are controlled by suitable control devices. The present invention may be carried out in a machine of this type but includes certain steps utilizing acid and caustic or caustic detergent, not disclosed in that patent.

SUMMARY OF THE INVENTION

In prior animal cage washers difficulty has been found in that no matter how much the animal cages and the pans are washed with water and detergents, the scale produced by animal urine is not removed. It has been found that use of certain acids is necessary to prevent scale build up or to de-scale parts of the animal cages or other parts being washed. The use of acids, however, creates the difficulty that the acid would damage soil pipes in the drain system. It is, therefore, an object of this invention to provide a method of the character described for washing animal cages and the like articles in which there is provision for both de-scaling the urine scale and to nevertheless prevent damage to the soil pipes.

Another object of this invention is to provide a method of the character described in which acid added to water, for a prewash, is followed by adding caustic detergent which neutralizes the acid, before draining, and then following the pre-wash by a caustic detergent wash and then by one or more rinses with water. As an alternative there is added to the acid wash, enough caustic to not only neutralize the acid but to raise the pH rating to a point where the acid together with the caustic detergent can be discharged to a sewer without damage to the sewer or soil pipes.

Yet another object of this invention is to provide an inexpensive method of the character described which will thoroughly clean the articles to be washed even if they have urine scale and also avoiding damage to the drainage system, and which shall be practical and efficient.

Other objects of this invention will in part be obvious and in part hereinafter pointed out.

The invention accordingly consists in the steps which will be exemplified in the method hereinafter described, and of which the scope of invention will be indicated in the following claims.

DESCRIPTION OF THE PREFERRED EMBODIMENTS

The improved method relates to an automatic detergent system for application to animal cage washing and washing of other similar articles.

The system is to function so as to allow the use of two wash cycles in the same machine. One would be a standard cycle consisting of a detergent wash followed by one or more rinses. The second or acid wash cycle would consist of a pre-wash utilizing an acid detergent wash followed by a caustic detergent wash followed by one or more rinses. The system will utilize liquid detergents injected into the washing chamber by pumping devices or solid reagents injected by appropriate means. Suitable controls will be supplied to make possible necessary adjustment of the volume of injected chemicals. Adjustment will be available for the acid detergent wash time and caustic detergent wash period. The control system shall be such that all acid washes are neutralized to approximately pH 7 before the wash water is discharged to a sewer. This may be accomplished by pre-set timers as in U.S. Pat. No. 3,277,906 or by a controlling pH meter or by using measured quantities of reagents.

In one version, the acid pre-wash water would be neutralized before being discharged to the sewer at the end of acid wash prior to refilling with fresh water for a caustic wash. In another version the acid pre-wash water would be retained in the machine, neutralized and then raised to a pH proper for caustic washing by the addition of proper reagents. After caustic wash, the wash water would then be discharged to a sewer. This latter system would result in appreciable water savings. Other variations of the system shall include injection of measured quantities of either liquid or solid reagents.

New process comprises:
(1) Acid wash to remove urine scale build up, or similar scale build up.
(2) Addition of caustic to acid wash water before discharging to drain to prevent damage to drain lines;
(3) Adding caustic detergent to acid wash water in sufficient quantity to not only neutralize the acid, but also to raise pH to level where the same water may then be used as a normal caustic wash, thus saving water by avoiding one drain and refill.

EXAMPLE 1

Steps (1) Fill the tank of the washer with water.
(2) Inject acid or acid detergents to water in tank. The acids may comprise mild phosphoric acid, hydrochloric acid, dichromate or acetic acid. For this purpose one may use Limeaway produced by Economics Laboratory Co. of St. Paul, Minn., or Dicoloid produced by Diversey Corp. of Chicago, Ill. These are acid detergents which may be employed.
(3) Pre-wash the animal cage in the washer with this acid or acid detergent solution. The acid in the solution during the pre-wash will pre-wash the urine scale from the animal cages and prevent scale build up. The acid is employed to remove inorganic soils such as calcium urine scale or other soils or scales insoluble in water. The acid solution will have a pH factor of 4–5.

(4) Without discharging the acid solution, inject caustic to neutralize the acid and raise the pH factor to about 7. The caustic may comprise sodium hydroxide, potassium hydroxide or calcium hydroxide. The length of the acid and caustic washes may be for any suitable periods. The caustic neutralizes the acid.

(5) Dump the neutralized solution to a sewer or drain. The caustic having neutralized the acid, the solution will run down the sewer without desolving the sewers such as cast iron soil pipes.

(6) Then refill the tank with water.

(7) Then inject caustic detergent such as Impact made by Economics Laboratory Co. of St. Paul, Minn., or Event of Economics Laboratory Co. or Whirl made by Diversey Corp. of Chicago, Ill. This caustic detergent together with sequestering agents make the hard water softer and hence constitutes a water softening agent. Trisodium phosphate filler may also be added and also defoaming chemicals and chlorine crystals. These chlorine crystals may comprise any chlorine salt such as calcium hypochlorite or sodium hypochlorite in crystalline form that releases chlorine when immersed in water and serve as an antiseptic. Such chlorine crystals have a well known use for disinfecting swimming pools. The caustic detergent added should be sufficient to bring the pH factor from 7 up to 8–11.

(8) Then wash with this caustic detergent solution together with the filler, defoaming chemicals, and chlorine crystals.

(9) Then dump the solution to the sewer.

(10) Then fill the tank with fresh water.

(11) Then rinse.

(12) Then dump or drain the rinse water to the sewer.

(13) Then optional or additional rinses may be employed.

EXAMPLE 2

Steps (1) Fill the tank of the washing machine with water.

(2) Add acid or acid detergent as described above sufficient to bring the water to pH 4–5.

(3) Pre-wash with the acid solution.

(4) Inject caustic or caustic based detergents or other detergents or any alkaline detergents such as described above enough not only to neutralize the acid but to produce a positive alkaline solution for washing the cages or other articles in the washing machine. During this step in the process caustic detergent is first added in sufficient quantity to bring the pH factor up to 7 and then added caustic detergent is injected to bring the pH factor up to 8–11.

(5) Wash the animal cages or other articles with this alkaline solution.

(6) Dump the solution to the sewer or drain.

(7) Fill the tank in the washing machine with fresh water.

(8) Rinse with the fresh water.

(9) Dump the rinse water.

(10) Then use optional additional rinses as desired.

It will be noted that with Example 2 one discharge of the water is saved and thereby saving a considerable amount of water.

In Example 1 the neutralized acid is dumped and then additional caustic detergent is added and that is dumped.

In Example 2 the neutralized and alkalinized acid is dumped thereby eliminating one dumping operation.

It will thus be seen that there is provided a method in which the several objects of this invention are achieved, and which is well adapted to meet the conditions of practical use.

As possible embodiments might be made of the above invention, and as various changes might be made in the embodiments above set forth, it is to be understood that all matter herein set forth is to be interpreted as illustrative and not in a limiting sense.

I claim:

1. A method for washing articles contaminated by animal waste in a washing machine having a tank, comprising supplying water to the tank, adding acid to the water to form an acid solution, washing the articles in the machine with said acid solution, and adding caustic to the acid solution to neutralize the acid solution.

2. The process of claim 1, wherein the acid added to the water is enough to bring the solution to pH 4–5 and the caustic added to the acid solution is enough to bring the neutralized solution to pH 7.

3. The process of claim 1, and draining the neutralized acid solution.

4. The process of claim 3, then supplying water to the tank, then adding caustic detergent to the supplied water in the tank to provide an alkaline solution, and then washing the articles in the machine with said alkaline solution.

5. The process of claim 4, wherein the acid added to the water is enough to bring the solution to pH 4–5 and the caustic added to the acid solution is enough to bring the neutralized solution to pH 7, and wherein the caustic detergent added to the water supplied to the tank after draining the neutralized acid solution is enough to bring the solution to pH 8–11.

6. The process of claim 4, then draining the alkaline solution from the tank and then filling the tank with fresh water and rinsing the articles in the machine therewith.

7. The process of claim 6, wherein a filler, defoaming chemicals and chlorine crystals are added together with the caustic detergent.

8. The process of claim 1, then adding caustic detergent to the neutralized acid solution to make the solution alkaline.

9. The process of claim 8, wherein caustic detergent added to the neutralized acid solution is enough to bring the solution to pH 8–11.

10. The process of claim 8, wherein the acid added to the water is enough to bring the solution to pH 4–5, the caustic added to the acid solution is enough to bring the neutralized solution to pH 7 and wherein the caustic detergent added to the neutralized solution is enough to bring the solution to pH 8–11.

11. The process of claim 8, then washing the articles in the machine, then draining the alkalinized solution from the machine.

12. The process of claim 11, then supplying fresh water to the tank, rinsing the articles and draining the water from the machine.

References Cited

UNITED STATES PATENTS 2,965,523   12/1960   Engle _____ 134—27
2,996,414   8/1961   Cardey _____ 134—27

MORRIS O. WOLK, Primary Examiner

S. MARANTZ, Assistant Examiner

U.S. Cl. X.R.

134—42